United States Patent
Boyle et al.

(10) Patent No.: US 8,433,342 B1
(45) Date of Patent: Apr. 30, 2013

(54) METHOD AND SYSTEM FOR PERSONALIZED VENUE MARKETING

(71) Applicant: Joingo, LLC, San Jose, CA (US)

(72) Inventors: Stephen S. Boyle, Lincoln, CA (US);
Giacomo Lami, San Jose, CA (US);
Nicolas Ruggieri, Walnut Creek, CA (US); Thang Dao, San Jose, CA (US)

(73) Assignee: Joingo, LLC, San Jose, CA (US)

( * ) Notice: Subject to any disclaimer, the term of this patent is extended or adjusted under 35 U.S.C. 154(b) by 0 days.

(21) Appl. No.: 13/671,538

(22) Filed: Nov. 7, 2012

(51) Int. Cl.
*H04Q 7/20* (2006.01)

(52) U.S. Cl.
USPC ............... 455/456.3; 455/456.1; 455/456.2; 455/458; 455/404.2; 235/375; 235/379; 705/30; 705/14.5; 705/14; 705/46

(58) Field of Classification Search ............... 455/466, 455/411, 419, 456.3, 404.2, 456.2, 846, 864, 455/412.1, 410, 450; 463/29; 705/14.58, 705/30, 14.45, 14.46; 370/328; 235/375, 235/379
See application file for complete search history.

(56) References Cited

U.S. PATENT DOCUMENTS

| 7,254,388 | B2 | 8/2007 | Nam et al. | |
|---|---|---|---|---|
| 2011/0170837 | A1* | 7/2011 | Barnes, Jr. | 386/239 |
| 2011/0223937 | A1 | 9/2011 | Leppanen et al. | |
| 2012/0047011 | A1 | 2/2012 | Rippetoe et al. | |
| 2012/0182877 | A1* | 7/2012 | Swaminathan | 370/242 |
| 2012/0203620 | A1 | 8/2012 | Dobyns | |
| 2012/0329555 | A1* | 12/2012 | Jabara et al. | 463/29 |

* cited by examiner

*Primary Examiner* — Patrick Edouard
*Assistant Examiner* — Fred Casca
(74) *Attorney, Agent, or Firm* — Clause Eight IPS; Michael Catania

(57) ABSTRACT

A method and system for personalized venue marketing is disclosed herein. An application that is resident on a mobile communication device of a patron sends personally identifiable information and the identifying device address to a server when the patron enters a venue. The server associates the identifying device address of the mobile device with the patron in a CRM database for the venue. The identifying device address allows for tracking of the patron by WiFi sensors positioned throughout the venue.

3 Claims, 12 Drawing Sheets

METHOD AND SYSTEM FOR PERSONALIZED VENUE MARKETING

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention generally relates to personalized marketing to mobile communication devices. More specifically, the present invention relates to a method and system for identifying a patron at a venue and transmitting personalized marketing to the patron's mobile communication device.

2. Description of the Related Art

Venues, such as casinos, would like to know when a patron is onsite. One method is the use of player cards. However, the patron usually needs to be playing a game for the card to be "active."

General definitions for terms utilized in the pertinent art are set forth below.

GSM, Global System for Mobile Communications is a second generation digital cellular network.

Code Division Multiple Access ("CDMA") is a spread spectrum communication system used in second generation and third generation cellular networks, and is described in U.S. Pat. No. 4,901,307.

Long Term Evolution ("LTE") is a next generation communication network.

Interactive voice response ("IVR") is a telephone technology in which a user uses a phone to interact with a database to acquire information.

Short Message Service ("SMS") is text messaging communication using a mobile phone or other device to send messages up to 160 characters in length.

Multimedia messaging service ("MMS") communication is a communication transmitted to and from a mobile phone that includes a multimedia content such as a digital photograph (JPEG), videos, and the like.

A SMS Gateway is used to send text messages with or without a mobile phone, and is used by aggregators to forward text messages to mobile phones.

BLUETOOTH technology is a standard short range radio link that operates in the unlicensed 2.4 gigaHertz band.

MAC address is a media access control address which is a unique identifier on a network interface card and stored in the memory of a device such as a mobile phone.

Mobile Originated ("MO") is a text message that is sent from a mobile phone.

Mobile Terminated ("MT") is a text message that is sent to a mobile phone.

Mobile App is an application program resident on a mobile device.

Public Switch Telephone Network ("PSTN") is a telecommunication system in which networks are inter-connected to allow telephones to communicate with each other throughout the world.

Telephone Consumer Protection Act ("TCPA") of 1991 restricts the use of SMS text messages received by mobile phones, and SMS messages sent without a consumer's consent can violate the TCPA.

APP is a software application for a mobile phone such as a smart phone.

Hypertext Transfer Protocol ("HTTP") is a set of conventions for controlling the transfer of information via the Internet from a web server computer to a client computer, and also from a client computer to a web server.

Internet is the worldwide, decentralized totality of server computers and data-transmission paths which can supply information to a connected and browser-equipped client computer, and can receive and forward information entered from the client computer.

FTP or File Transfer Protocol is a protocol for moving files over the Internet from one computer to another.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

Transfer Control Protocol/Internet Protocol ("TCP/IP") is a protocol for moving files over the Internet.

A SMS aggregator is an entity that provides connectivity with a mobile phone carrier by offering a SMS gateway to send and receive messages and other digital content.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Direct Inward Dialing ("DID") involves a carrier providing one or more trunk lines to a customer for connection to the customer's private branch exchange ("PBX") and a range of telephone lines are allocated to this line.

Voice over Internet Protocol ("VoIP") relates to voice communications (e.g. telephone calls) transmitted over the Internet such as SKYPE call.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Wireless Access Point ("WAP") is a device that allows wireless devices to connect to a wired network using WiFi, Bluetooth or related standards.

The prior art has failed to provide an easy means for determining when a patron is onsite and for tracking the patron onsite.

BRIEF SUMMARY OF THE INVENTION

The present invention is provides a solution to the problem. The present invention provides for detection of a patron at a venue, and for tracking of the patron at the venue.

One aspect of the present invention is a method for personalized venue marketing. The method includes downloading a mobile application to a mobile device of an end-user. The method also includes collecting personally identifiable information on the end-user. The method also includes sending the personally identifiable information to a server. The server configured to extract the IP address from the message which was originated by the mobile device and map the IP address into its corresponding identifying device address and where the personally identifiable information is used to find the CRM entry for the user and associate the identifying device address with that user of the mobile device with the end-user. The method also includes receiving a wireless communications protocol request from the mobile device at a wireless sensor within a venue, the wireless communications protocol request comprising the identifying device address for the mobile device. The method also includes triggering a message comprising the identifying device address from the wireless sensor to the server, which triggers a plurality of marketing activities to transmit to the end-user.

Another aspect of the present invention is a method for personalized venue marketing. The method includes downloading a mobile application to a mobile device of an end-user. The method also includes constructing an indentifying application address at the mobile application on the mobile device. The method also includes sending the indentifying application address to a server. The server is configured to extract the IP address from the message which was originated by the mobile device and map the IP address into its corresponding identifying device address and where the personally identifiable information is used to find the CRM entry for the user and associate the identifying device address with that end-user of the mobile device with the end-user. The method also includes receiving a wireless communications protocol request from the mobile device at a wireless sensor within a venue, the wireless communications protocol request comprising the identifying device address for the mobile device. The method also includes triggering a message comprising the identifying device address from the wireless sensor to the server, which triggers a plurality of marketing activities to transmit to the end-user.

Yet another aspect of the present invention is a system configured to present personalized marketing to patrons as they enter and move around a venue. The system is comprised of a mobile device supporting wireless communication, an access point designed to sense the presence and signature of the mobile device and report this information, a service configured to request patron input to associate the signature of the device with the identify of the patron, a service configured to translate the signature into a patron identity, and a content server designed to deliver personalized content to the mobile device based upon the end user identity.

The mobile communication device is preferably a mobile phone or a tablet computer.

The venue marketing system can include the whole venue or a defined area in a large venue such as club, pool, or other areas. In venue sensors are utilized, preferably WIFI POPs (Point Of Presence). The accuracy is measured in tens of feet, but it depends upon many parameters such as echos or dynamic parameters such as crowds or carts. The association between the mobile device and patron is what is desired by the venue tracking. A MAC Address <-> PatronID. is triggered upon entrance to the venue. A WIFI OTA protocol senses the MAC address and forwards to the trigger message to a remote server.

Another aspect of the invention is marketing to a visitor in the venue. This aspect of the invention turns WIFI login pages into specials and offers from the venue. The can be offers within a native application on the mobile device. Personalized Offers to the patron are based upon MAC tracking and visit history if the end-user of the mobile device is anonymous (not known by the venue and the mobile device does not have a native application for the venue. The personalized marketing is alternatively based upon on a PlayerID (loyalty account number) if a MAC<->PlayerID association has been made by the venue. Visit tracking reports on how many visits are made to the venue and who is in venue. The time is also recorded in each area of the venue.

For an unknown guest that enters the venue, a MAC trigger will be received if a WIFI of the mobile device is on. For this situation, specials are presented in the WIFI Login Page if auto-connected or if a data fetch is made by the mobile device.

When a known guest enters the venue, but the mobile device of the guest does not have a downloaded venue application, a MAC Trigger will be received if WIFI of the mobile device is on. For this situation, personalized offers are presented in the WIFI Login Page if auto-connected or data fetch is made. Also, SMS push registered SMS subscriber offers are made.

When a known guest enters the venue, and the mobile device of the guest does have a downloaded venue application, a MAC Trigger will be received if WIFI of the mobile device is on. Personalized offers are presented in the WIFI Login Page if auto-connected or a data fetch is made. Push messaging is also sent to the patron through the application.

The remote server is preferably configured to perform the following: receive a [MAC,SSID,IP] in header sent by a client; add MAC address to a mobile device record; add table [MAC,IP,PID] to a patron server; listen for WIFI registrations at a patron server; push WIFI-Regs into JSB by a patron server; return WIFI login marketing from the patron server; translate WIFI-Reg into a Push message.

Having briefly described the present invention, the above and further objects, features and advantages thereof will be recognized by those skilled in the pertinent art from the fol-

DETAILED DESCRIPTION OF THE INVENTION

Figure 1:
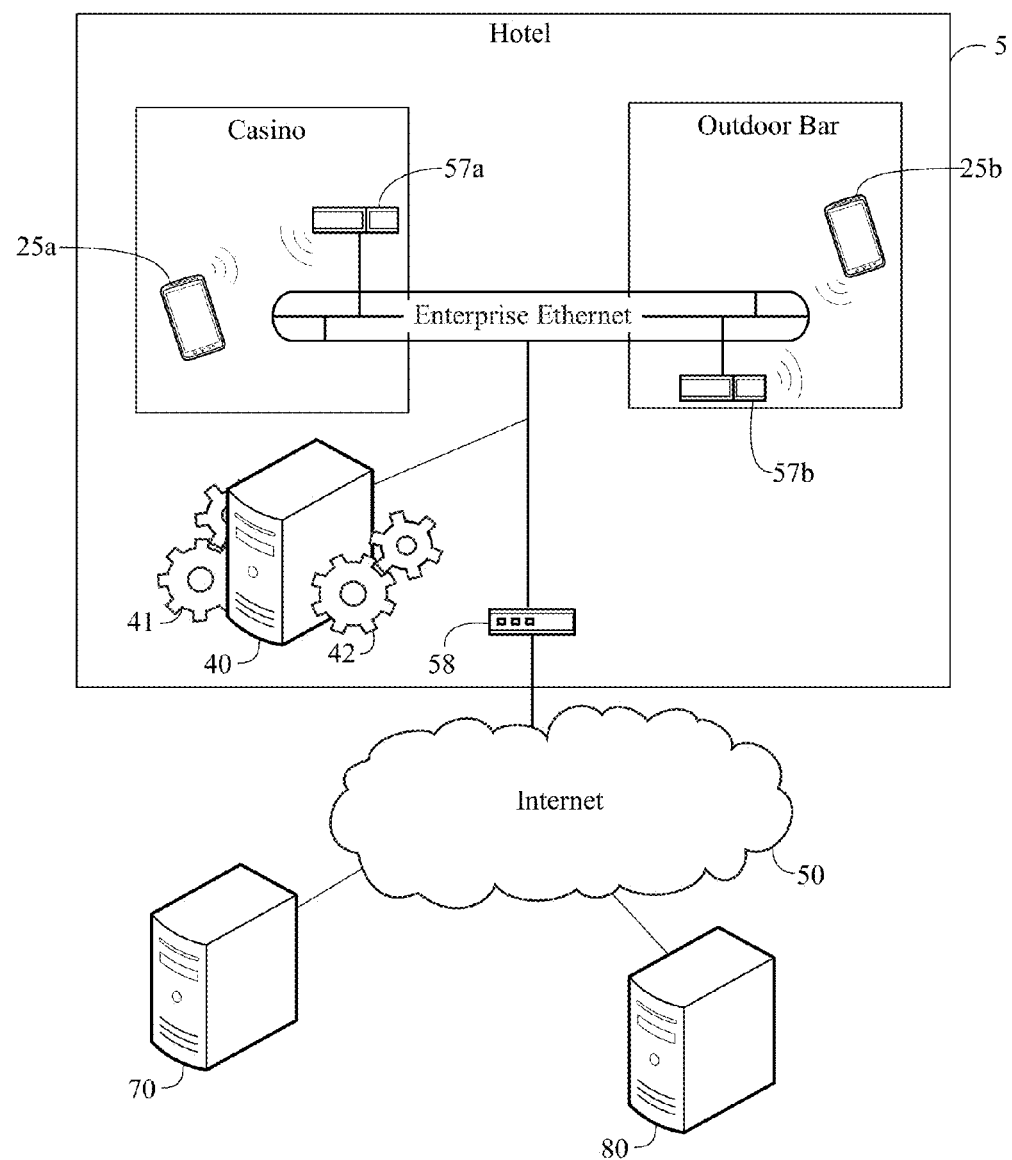
FIG. 1 is a block diagram of a system for personalized venue marketing.

A preferred embodiment of a system for personalized venue marketing is shown in FIG. 1. As shown in FIG. 1, a mobile communication device 25a is capable of connecting to a local area network ("LAN") through a wireless access point ("WAP") 57a or 57b of a facility 5, through an Ethernet of the facility, and through a firewall 58 of the facility. The facility has a server 40 that connects to the Internet 50. An authentication service 41 is configured to request patron input to associate the signature of the device with the identity of the patron, and a marketing content service 42 is configured to translate the signature into a patron identity ("PID"). A third-party server 80 is accessible over the Internet 50. The mobile communication device 25a has a resident mobile application for accessing the third party server 80. A content server 70 is also shown.

Figure 2:
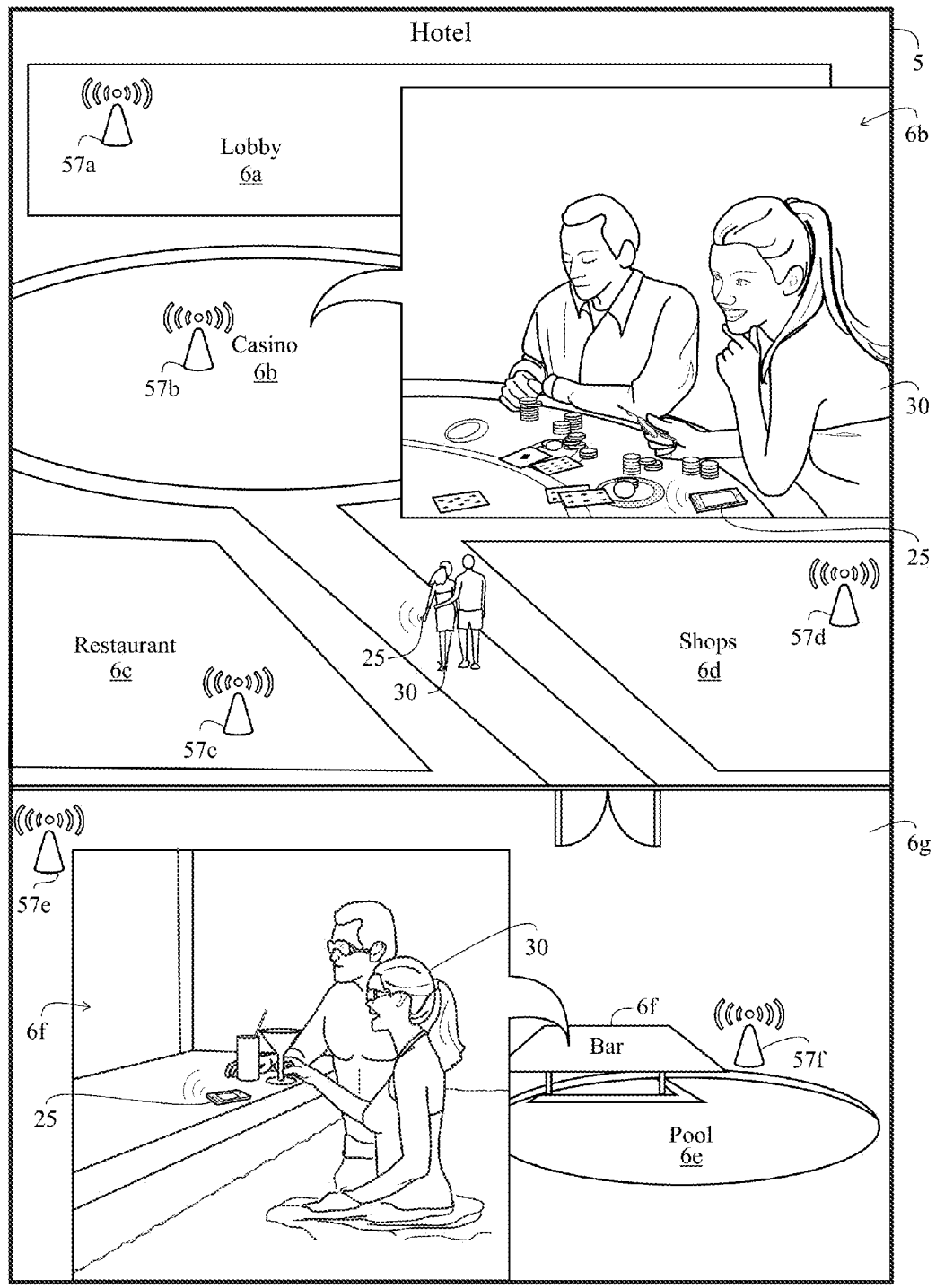
FIG. 2 is an illustration of a patron's movements throughout a venue and the ability of the venue to track the patron utilizing the present invention.

As shown in FIG. 2, a patron 30 moves through the areas 6a-6f of a resort 5, WAPs 57a-57f are able to track the mobile communication device 25 of the patron 30, allowing the facility to track his movements and monitor his time gambling or his time at a poolside bar.

Figure 3:
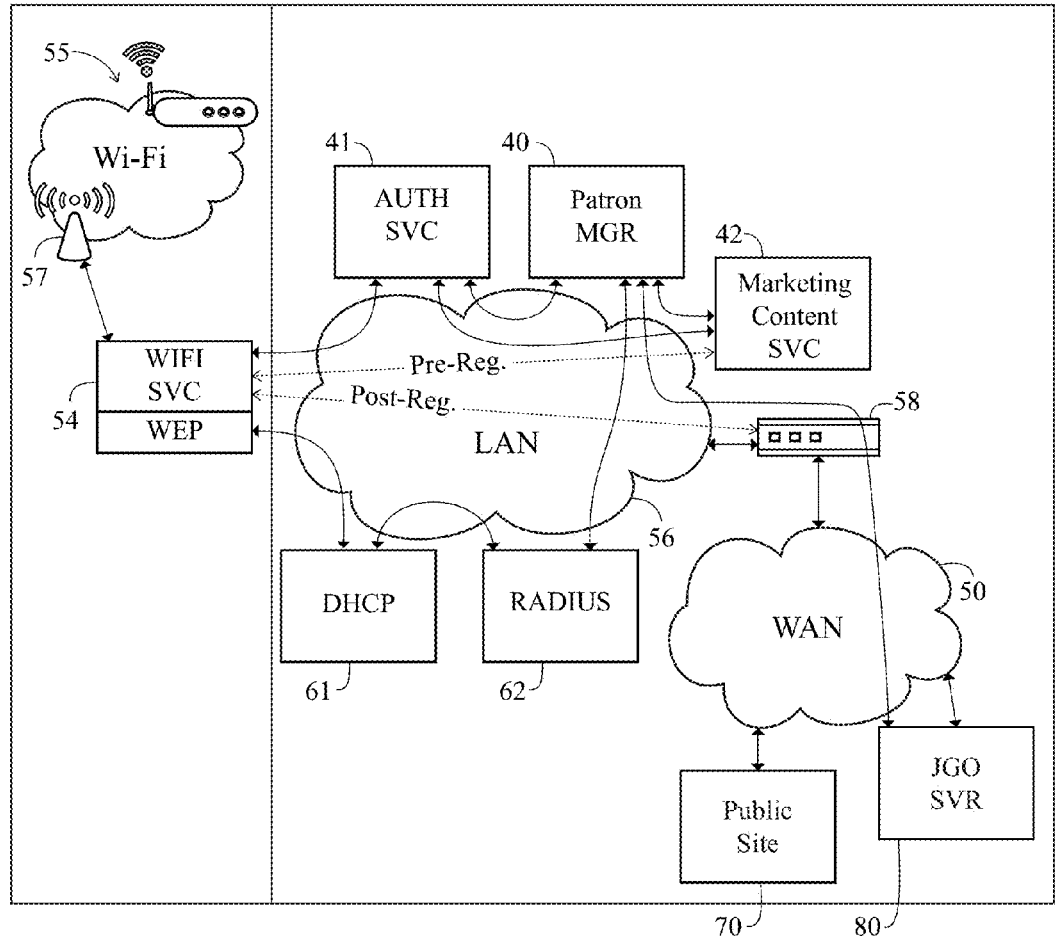
FIG. 3 is a block diagram of a system for personalized venue marketing.

FIG. 3 is a block diagram of a preferred system for personalized venue marketing. A WAP 57 connects the WiFi server 54 to the WiFi system 55. The WiFi server communicates with the other services, such as Dynamic Host Configuration Protocol ("DHCP") 61, Remote Authentication Dial In User Service ("RADIUS") 62, authentication service 41, and marketing content service 42, and with the patron server 40 through the LAN 56. Communication with the remote server 80 and the content server 70 is through the Internet 50 through the firewall 58.

Figure 4:
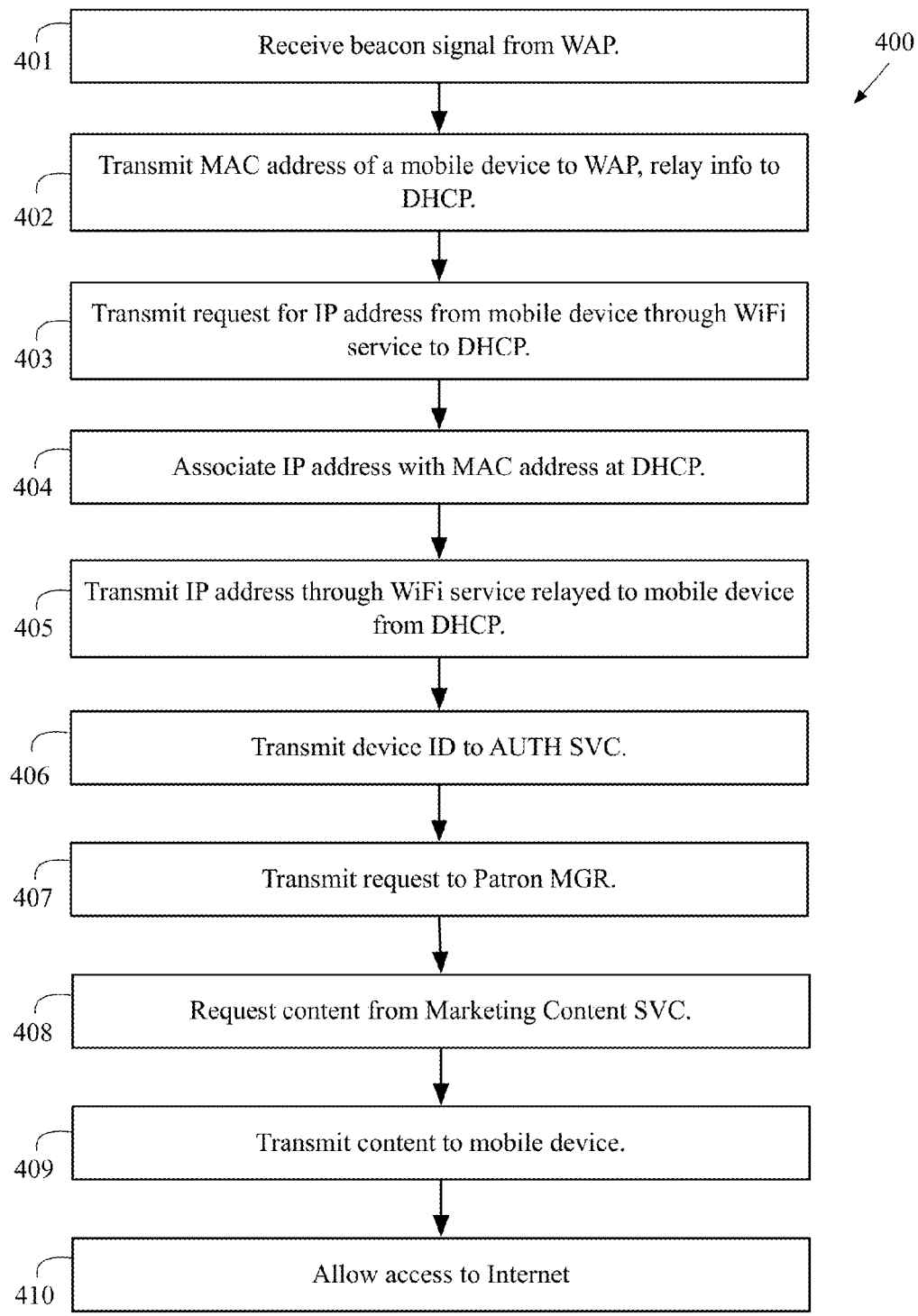
FIG. 4 is a flow chart of a method for personalized venue marketing.

FIG. 4 is a flow chart of a method 400 for personalized venue marketing. As shown in step 401, a device receives a signal from the WAP. The device's Media Access Control ("MAC") address is transmitted to the WAP and relayed to the DHCP server, as shown in step 402. A request for an IP address is sent from the device to the DHCP server through the WiFi service in step 403. In step 404, the assigned IP address is associated with the MAC address at the DHCP server, and the IP address is forwarded to the device through the WiFi service, as shown in step 405. Then, the device's ID is transmitted to the authentication service in step 406, a request is sent to the patron server in step 407, and a request for content is sent from the marketing content service in step 408. The requested content is delivered to the device in step 409 and the device is then allowed access to the Internet, as shown in step 410.

The mobile communication devices utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Most of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP") or other similar protocols. The transmission protocol ranges from SIP to MGCP to FTP and beyond. The protocol at the server is preferably HTTP.

A mobile communication service provider (aka phone carrier) of the customer such as VERIZON, AT&T, SPRINT, T-MOBILE, and the like mobile communication service providers, provide the communication network for communication to the mobile communication device of the end user.

The facility is preferably a casino, resort or leisure facility.

A typical mobile communication device 25 includes an accelerometer, a head phone, a microphone, a speaker, a GPS chipset, a Bluetooth component, a WiFi component, a 3G/4G component, a BaseBand Processor (for radio control), an applications processor, a JTAG (debugger), a SDRAM memory, a Flash memory, SIM card, LCD display, a camera, a power management circuit and a battery or power source.

Figure 5:
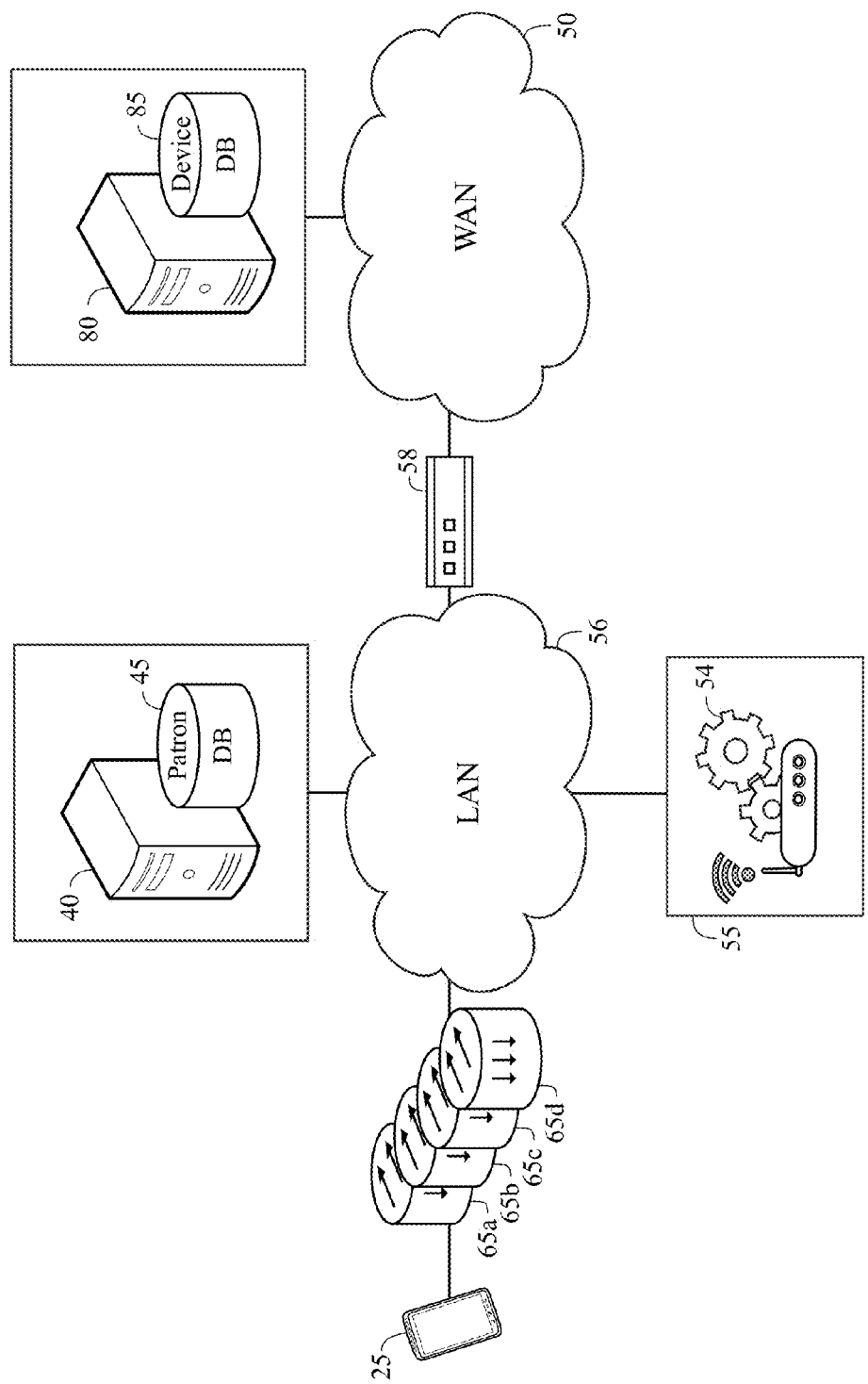
FIG. 5 is a block diagram of the implementation components of the system for personalized venue marketing.

A system for personalized venue marketing is shown in FIG. 5. A mobile communication device 25 is monitored by POPs (point of presence) 65a-65d. The POPs 65a-65d are on the LAN 56. A patron server 40 and a patron database ("DB") 45 are also on the LAN 56. A WiFi server 54 of a WiFi system 55 is also on the LAN 56. The LAN 56 is in communication with a WAN 50 through a firewall 58. A remote server 80 and a remote DB 85 are in communication with the LAN 56 through the WAN 50. In a preferred embodiment, the WAN 50 is the Internet.

Figure 6:
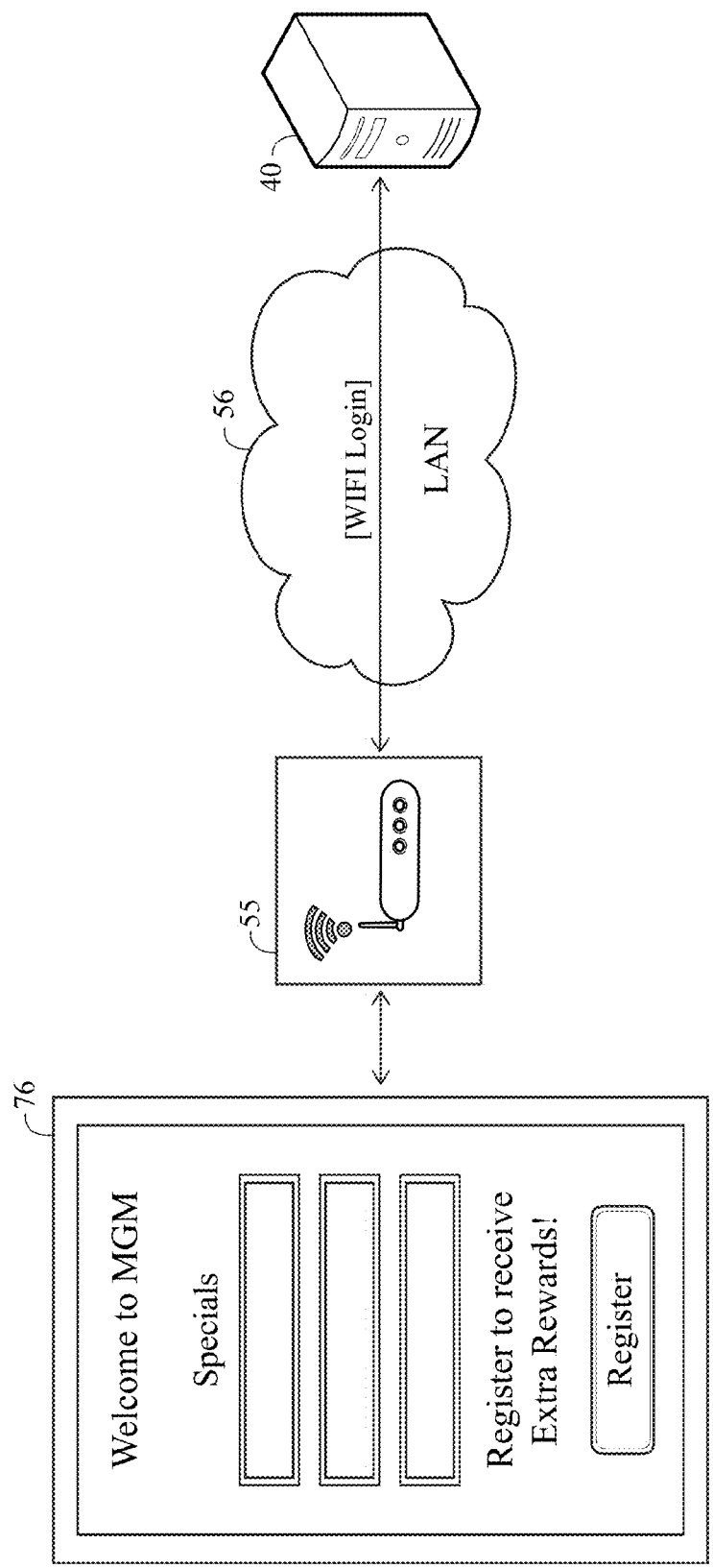
FIG. 6 is a block diagram of WiFi registration for use of the personalized venue marketing system of the present invention.

FIG. 6 illustrates a WiFi registration for use of the personalized venue marketing system. A registration message 76 is displayed on a mobile device, which is in communication with the WiFi system 55 of the venue. The WiFi system 55 is on the LAN 56, which is in communication with a patron server 40. Once a request for Internet access is received from the mobile communication device 25, a WiFi login message is sent to the device from the patron server 40 through the LAN 56.

Figure 7:
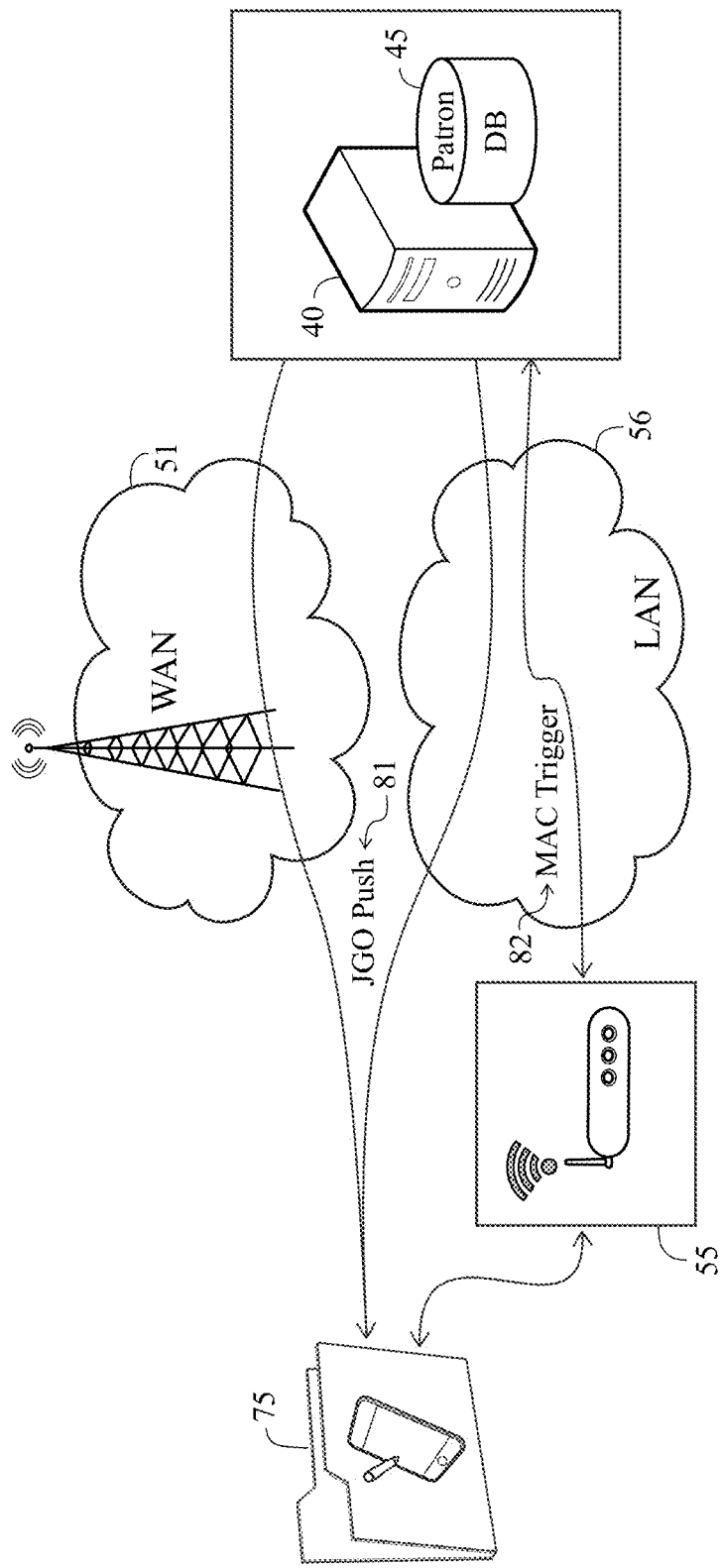
FIG. 7 is a block diagram of a MAC address trigger of the personalized venue marketing system of the present invention.

FIG. 7 is an illustration of a MAC address triggering of an alert that a patron is on-site at a venue. A mobile application 75 on a mobile device 25 of a patron interacts with the WiFi system 55 of the venue. The Over The Air ("OTA") protocol senses the MAC of the patron's device and forwards the information to the patron server 40 over the LAN 56. Communication between the patron server 40 and the mobile application 75 is through the LAN 56, or alternatively through a WAN 51 of a communications network as an application push 81.

The patron DB 45 resolves the MAC address to the device to determine if the Guest is known or unknown. If an Unknown Guest enters the venue and the WiFi of the device is on, specials will be presented to the guest in a WiFi Login Page if the device auto connects or there is a data fetch. If a Known Guest enters the venue but does not have the application 75 installed on their device and the WiFi of the device is on, there will be an SMS push through the cellular WAN 51 for personalized offers presented to the guest in a WiFi Login Page if the device auto connects or there is a data fetch. If a Known Guest enters the venue with the application 75 installed on their device and the WiFi of the device is on, there will be a an application push 81 for personalized offers presented to the guest in a WiFi Login Page if the device auto connects or there is a data fetch. In each case, there will be a MAC Trigger 82 if the device has the WiFi on.

Figure 8:
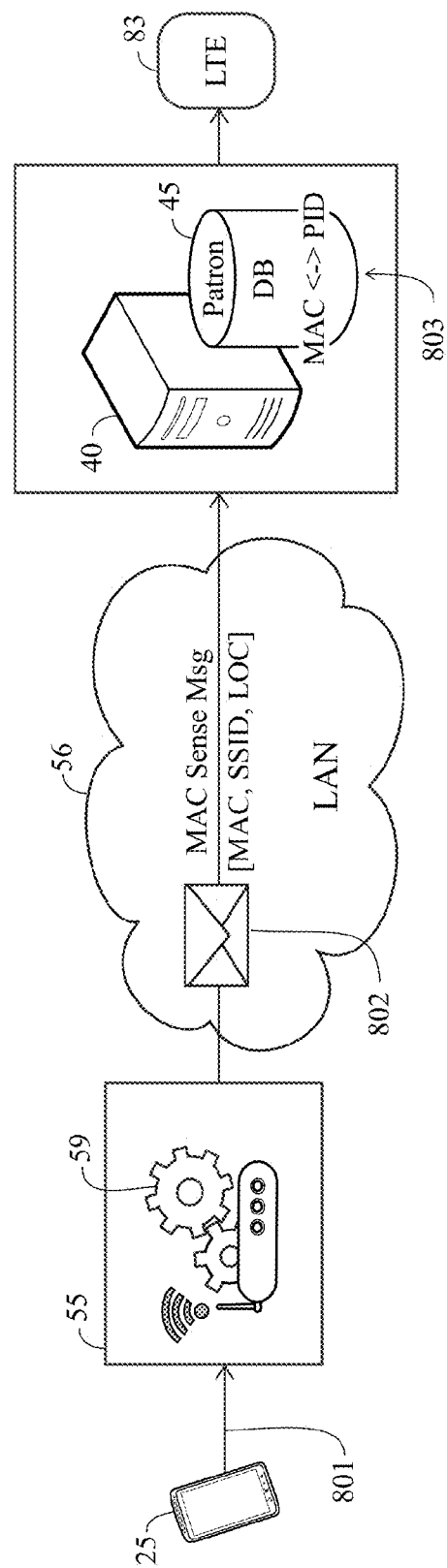
FIG. 8 is a block diagram of the message flows for MAC address sensing of the personalized venue marketing system of the present invention.

FIG. 8 illustrates the message flow of a MAC address sensing by a POP 65. The device 25 scans the network for an 802.11 probe response 801. Once the WiFi system 55 picks up the device, the Mobility Services Engine ("MSE") 59 sends a MAC Sense message 802, including such information as the MAC address, the SSID, and the location, to the patron server 40. The MAC record is updated 803 in the patron DB 45 and the patron server 40 then produces a Location Trigger Event 83 as a push message event 1201.

Figure 9:
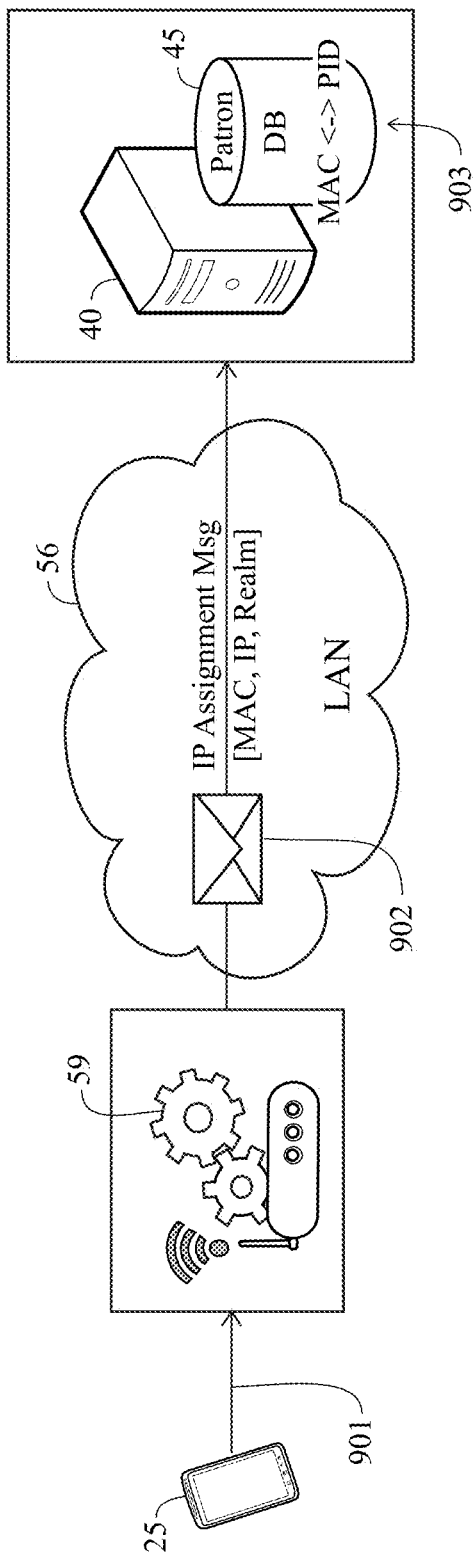
FIG. 9 is a block diagram of the message flows for IP address registration of the personalized venue marketing system of the present invention.

FIG. 9 illustrates the message flow of IP registration of a device. The device 25 obtains an IP address through the DHCP server 901, the MSE 59 forwards the address information in an IP Assignment message 902, including such information as the MAC address, the IP address and the routing realm, to the patron server 40. The MAC record is updated 903 in the patron DB 45.

Figure 10:
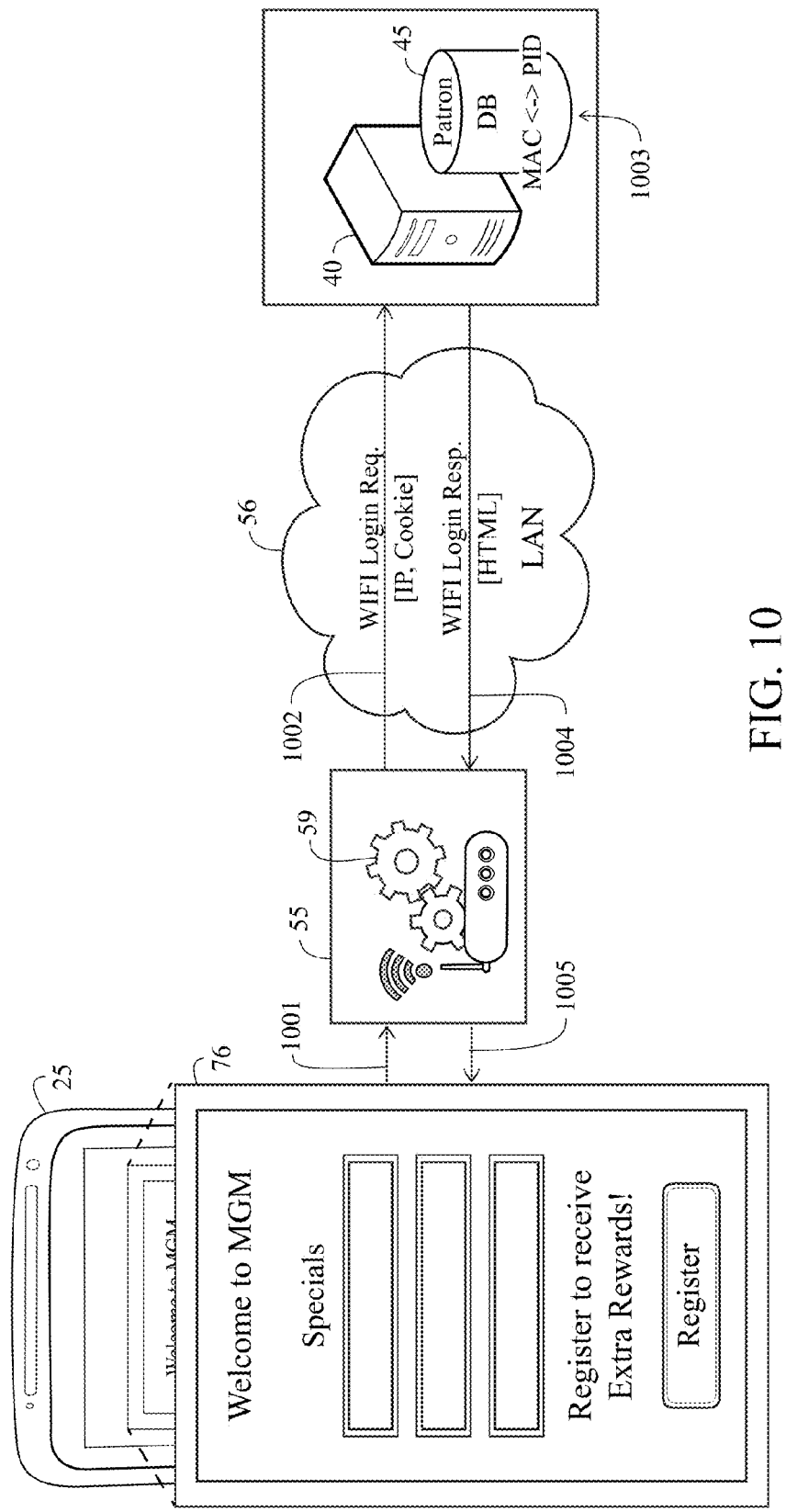
FIG. 10 is a block diagram of the message flows for WiFi login of the personalized venue marketing system of the present invention.

FIG. 10 illustrates the message flow of a WiFi login. The device 25 scans and finds 1001 a WiFi 55 network and the MSE 59 sends a WiFi Login request 1002, including the IP address and cookie information, to the patron server 40. The MAC record is updated 1003 in the patron DB 45 and the patron server 40 sends back a WiFi Login response 1004 in HTML format. The WiFi server 54 forwards the response 1004 to the device 25 to present the login page 76.

Figure 11:
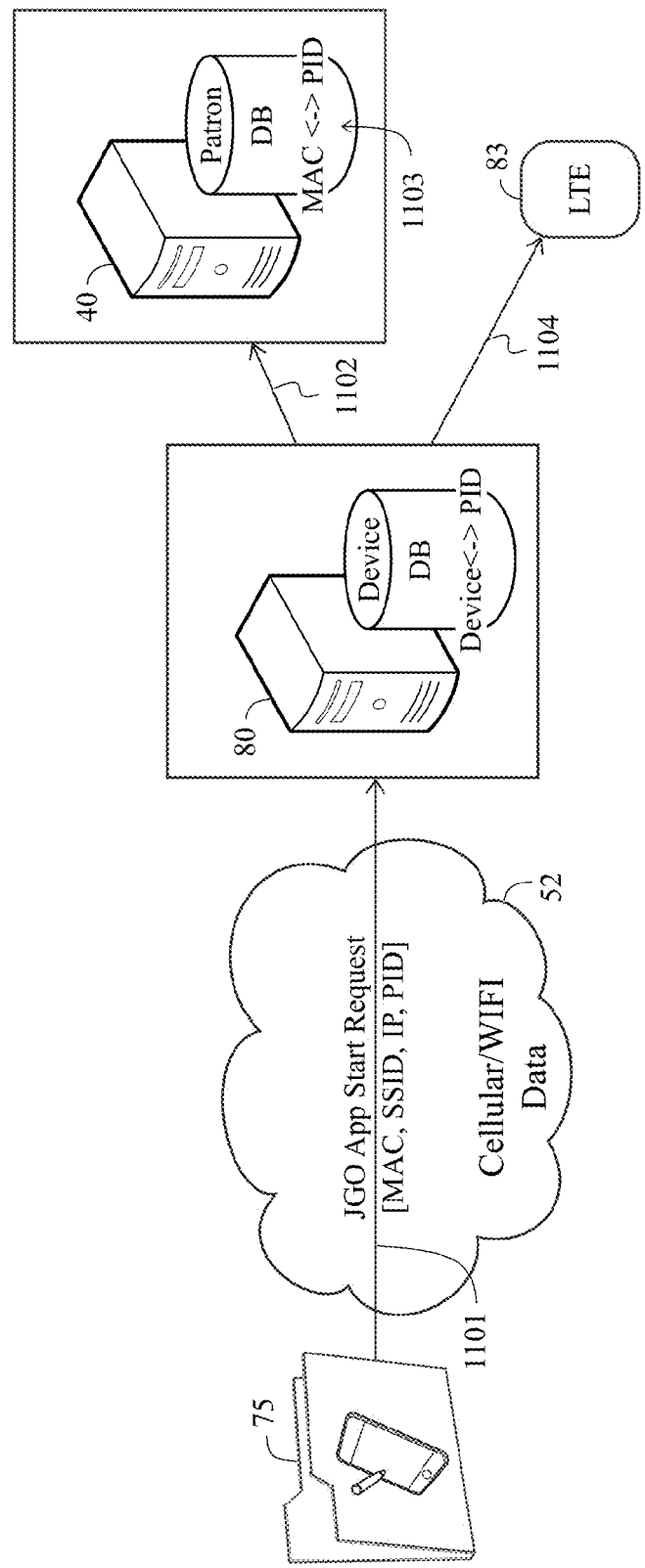
FIG. 11 is a block diagram of the message flows for an application start of the personalized venue marketing system of the present invention.

FIG. 11 illustrates the message flow of the start of the application. The Client (the application 75 on the device 25) starts and makes the first request 1101 across the cellular/WiFi data network 52 to the remote server 80. Included in the request is data such as the MAC address, the SSID, the IP address, and the PID. The remote server 80 authenticates 1102 the Client's PID, password, MAC address, SSID, and IP address with the patron server 40. Then the patron server 40 associates 1103 the PID to the MAC and then the remote server 80 generates 1104 a Location Trigger Event 83.

Figure 12:
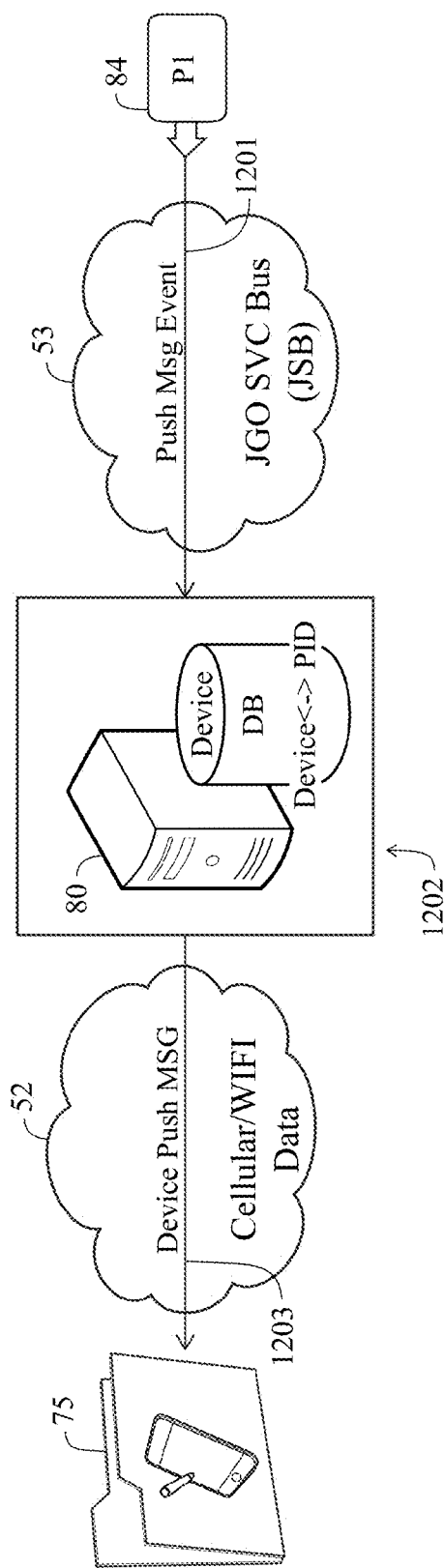
FIG. 12 is a block diagram of the message flows for push messaging of the personalized venue marketing system of the present invention.

FIG. 12 illustrates the message flow of a Push Message. The producer of content 84 publishes a Push Message Event ("PME") 1201 on the JGO service bus (JSB) 53. The remote server 80 takes the PME and translates 1202 it into a Device Push Message 1203, delivering the Device Push Message 1203 back across the cellular/WiFi data network 52 to the application 75.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method for personalized venue marketing, the method comprising:
    downloading a mobile application to a mobile device of an end-user;
    collecting by the downloaded mobile application personally identifiable information on the end-user and a MAC address for the mobile device;
    sending the personally identifiable information and the MAC address to a remote server, the remote server utilizing the personally identifiable information to locate a customer relations management entry for the end-user in a customer relations management database for a loyalty program for a venue;
    associating the MAC address of the mobile device with the end-user at the remote server based on the customer relations management entry for the end user and the MAC address transmitted from the downloaded mobile application on the mobile device;
    receiving a wireless communications protocol request from the mobile device at a wireless sensor within the venue, the wireless communications protocol request comprising the MAC address for the mobile device; and
    triggering a message comprising the MAC address from the wireless sensor to the remote server that the mobile device of the end user is on-site at the venue, which triggers a plurality of marketing activities to transmit to the end-user; wherein a marketing activity is an alert message to a host personnel in the venue, an SMS message to the user, or an in-application push message to the user; and
    wherein each of the plurality of wireless communications protocol request is an 802.11 probe request message.

2. The method according to claim 1 wherein the personally identifiable information is a loyalty account number, a phone number or an email address.

3. The method according to claim 1 wherein the wireless sensor is a WIFI (802.11) Point of Presence (POP).

* * * * *